Oct. 27, 1925.
W. J. PETTY
1,558,625
CULTIVATOR ATTACHMENT
Filed Aug. 25, 1924     3 Sheets-Sheet 1
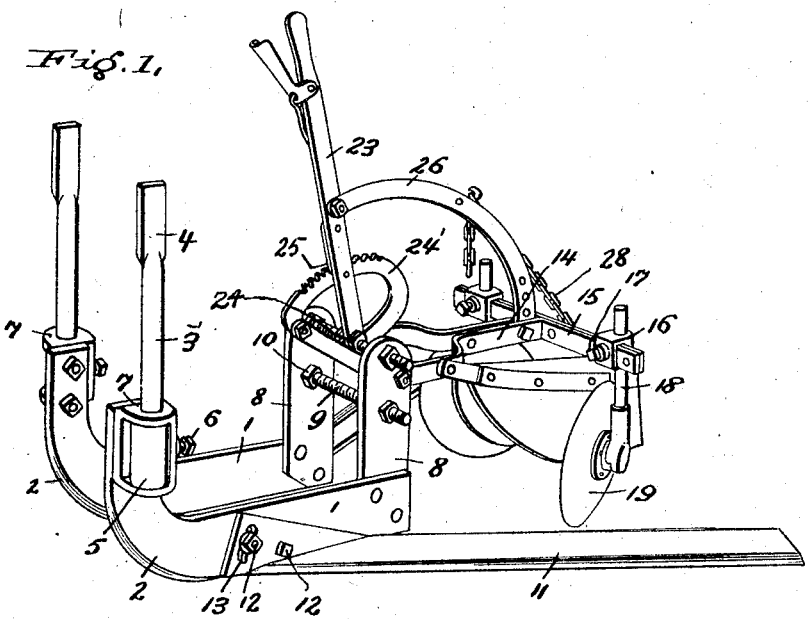
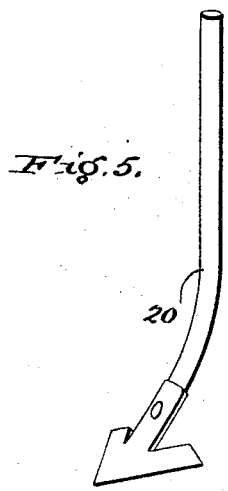
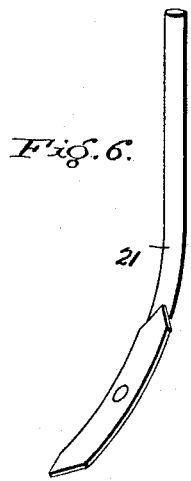
William J. Petty.
INVENTOR
BY Victor J. Evans
ATTORNEY
WITNESS: Gerald Hennesy Oct. 27, 1925.

W. J. PETTY 1,558,625

CULTIVATOR ATTACHMENT

Filed Aug. 25, 1924

William J. Petty
INVENTOR

BY Victor J. Evans
ATTORNEY

WITNESS: Gerald Hennesy

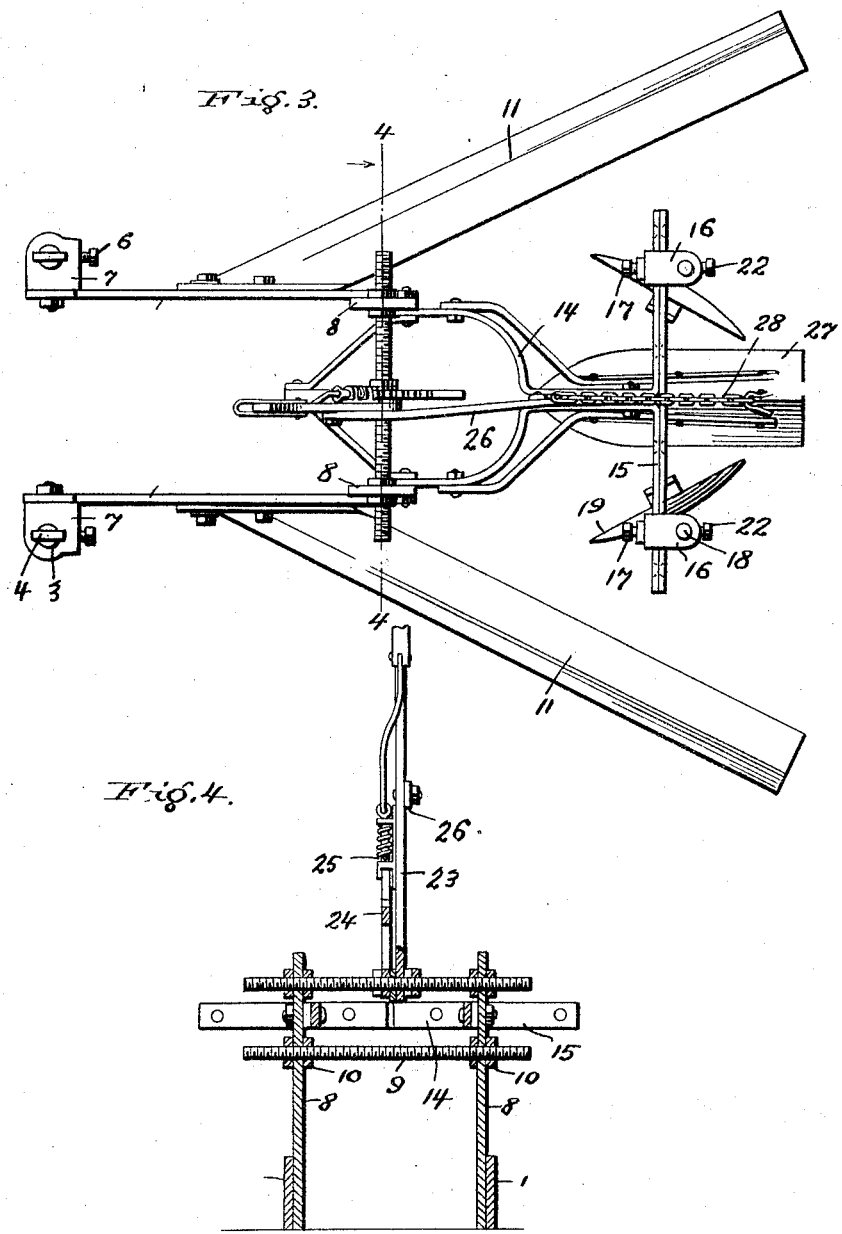

Patented Oct. 27, 1925.

1,558,625

UNITED STATES PATENT OFFICE.

WILLIAM JONES PETTY, OF HOLLIS, OKLAHOMA.

CULTIVATOR ATTACHMENT.

Application filed August 25, 1924. Serial No. 734,094.

*To all whom it may concern:*

Be it known that I, WILLIAM JONES PETTY, a citizen of the United States, residing at Hollis, in the county of Harmon and State of Oklahoma, have invented new and useful Improvements in Cultivator Attachments, of which the following is a specification.

This invention relates to an attachment for cultivators, the general object of the invention being to make the attachment in the form of the sled type of cultivator so that when it is fastened to a wheeled cultivator the implement will have all the advantages of a sled cultivator and the light draft of a wheeled cultivator.

Another object of the invention is to so arrange the plows and knives that the soil will be stirred to a slight depth and the plants will be left on or below a level and not placed on a ridge as is done with the cultivators now in use.

A further object of the invention is to provide a lever for controlling the depth at which the plows operate which is placed where it can be easily reached by the operator on the seat of the cultivator.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a perspective view of the invention.

Figure 3 is a plan view.

Figure 4 is a section on line 4—4 of Figure 3.

Figures 5 and 6 are views of tools which may be used in place of the disks.

Figure 2:
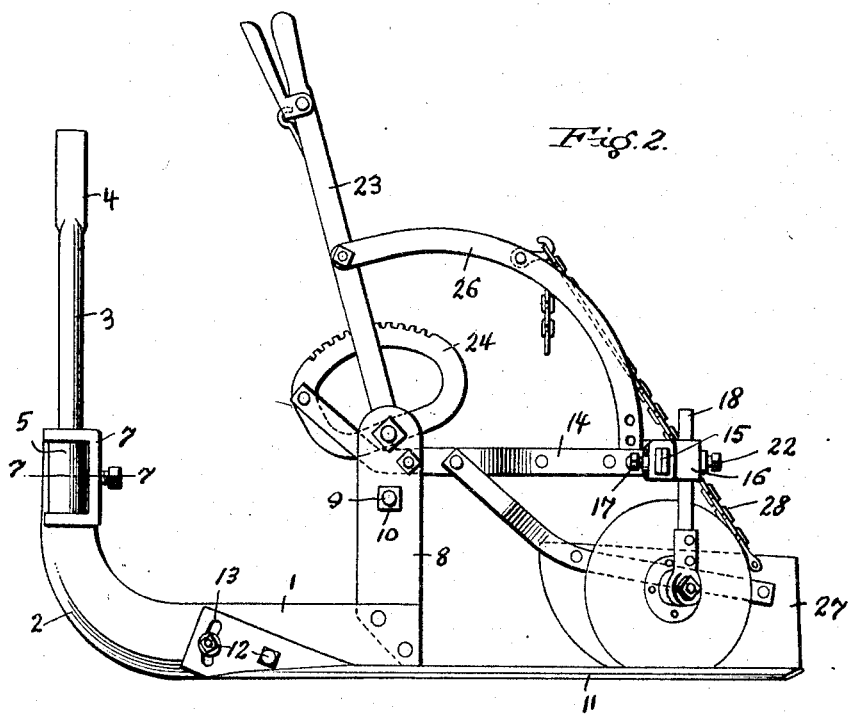
Figure 2 is a side view thereof.
Figure 7:
Figure 7 is a section on line 7—7 of Figure 2.

In these views 1 indicates a pair of runners which have their curved front edges beveled to provide cutting edges 2 for cutting through trash and the like instead of running over such trash. Each runner is connected with a standard 3 which has a flat upper end 4, which is adapted to engage a clamp on the beam of the cultivator. A sleeve 5 is adapted to be clamped to the lower end of each standard 3 by means of a bolt 6 and the sleeve is located in a boxing 7 fastened to the runner. In cultivators where the beams are pivotally attached to the frames the bolt 6 passes through the boxing so that the runner is rigidly attached to the standard but in cultivators where the beams are rigid the bolt 6 simply passes through the sleeve and engages the standard as shown in dotted lines in Figure 7 so that the sleeve has movement in the boxing and the runner is swiveled to the standard. Uprights 8 are fastened to the rear ends of the runners and these uprights are adjustably connected together by the threaded rods 9 and the nuts 10, each rod having two pairs of nuts thereon, each pair engaging an upright. Thus the uprights can be adjusted on the rods to place the runners any desired distance apart and by adjusting the nuts on one rod to a different degree from those on the other the runners can be tilted to place the knives 11 at the desired angle. When the uprights are vertical the knives are horizontal. These knives extend at an angle from the runners and are fastened to the runners by the bolts 12 which pass through the upturned ends of the knives. One bolt for each runner passes through a slot 13 in the knife so that the knife can be adjusted to place its cutting edge at the proper angle.

A frame 14 is pivoted at its forward end to the uprights 8 and the rear transverse part 15 of this frame supports the clamps 16 which are slidably mounted on said part and are held in adjusted position thereon by the clamp screws 17. These clamps engage the standards 18 of the disks 19 or the standards of the tools 20 and 21. The standards are adjustably held in the clamps by the bolts 22. A hand lever 23 is pivotally supported by the upper rod 9 and is held at the center of said rod by the nuts 24. This lever is provided with the usual detent means shown generally at 25. It is connected with the rear part of the frame 14 by the curved bar 26 so that as the lever is moved the frame 14 will be rocked to cause the tools to engage the ground or to be raised above the ground. This lever 23 is so positioned that it will come adjacent the operator's seat of the cultivator so that he can control the position of the plows or tools from his seat.

A shield 27 for preventing small plants from being covered by the dirt thrown up by the plows is supported under the frame 14 and between the disks 19 by the chains 28. Of course, this shield is only used when the plants are small.

As will be seen the attachment is made similar to a sled cultivator but as it is attached to a wheel cultivator it will have the light draft of a wheeled device. The knives and disks are so arranged as to give shallow and level cultivation and the plants will not be hilled or ridged. Thus the plants will stand a great deal more drought than if they were hilled. By using the attachment on a wheeled cultivator the same tools can be used for cultivating the plants the entire season which is not possible with the sled type of cultivator, as in this type the first cultivation fills the furrows and the elimination of the furrows prevents the sled from being used again as furrows are necessary to hold the device to the road. The knives will run a slight distance under the soil, causing it to crack and thus allows the fine sand to pass between the cracks and not blow away or pile up against the plants.

Where it is desired to break up the soil to permit the plants to come through it the tool shown in Figure 6 at 21 is used in place of each disk. This small plow is set to run at the edge of the row so that it will break up the soil and permit the plants to come through.

The plow shown in Figure 5 can be used in place of the disk when desired. This plow will not move as much dirt as the disk will.

This attachment can be used on irregular ground where it would be difficult to use a sled cultivator, for this device is attached to the beam, or beams, of a wheel cultivator, and by adjusting the beam the attachment can be set to adjust itself to irregularities of the ground.

From the foregoing it will be seen that I have provided an attachment which can be manufactured to sell at low cost and which can be easily and quickly attached to various types of wheeled cultivators, and one in which the plows or disks can be readily set to operate at the proper depth from the operator on the seat of the cultivator. It will give the cultivation found most advantageous for plants in increasing their drought resisting powers.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

A device of the class described comprising a sled having runners, boxes at the front ends of the runners, an upright rotatably supported in each box, means for holding the uprights against rotary movement in the boxes, said uprights being adapted to be fastened at their upper ends to a wheeled cultivator, a knife carried by each runner, a plow carrying frame pivotally connected with the rear part of the sled and a hand lever on the sled for adjusting the frame, said lever extending forwardly so that it may be actuated by an operator on the wheeled cultivator.

In testimony whereof I affix my signature.

WILLIAM JONES PETTY.